Sept. 13, 1966  F. L. GRANGER, JR., ET AL  3,271,939
POWERED UNIT FOR A LAWN MOWER OR SIMILAR DEVICE
Filed Dec. 19, 1963  3 Sheets-Sheet 1
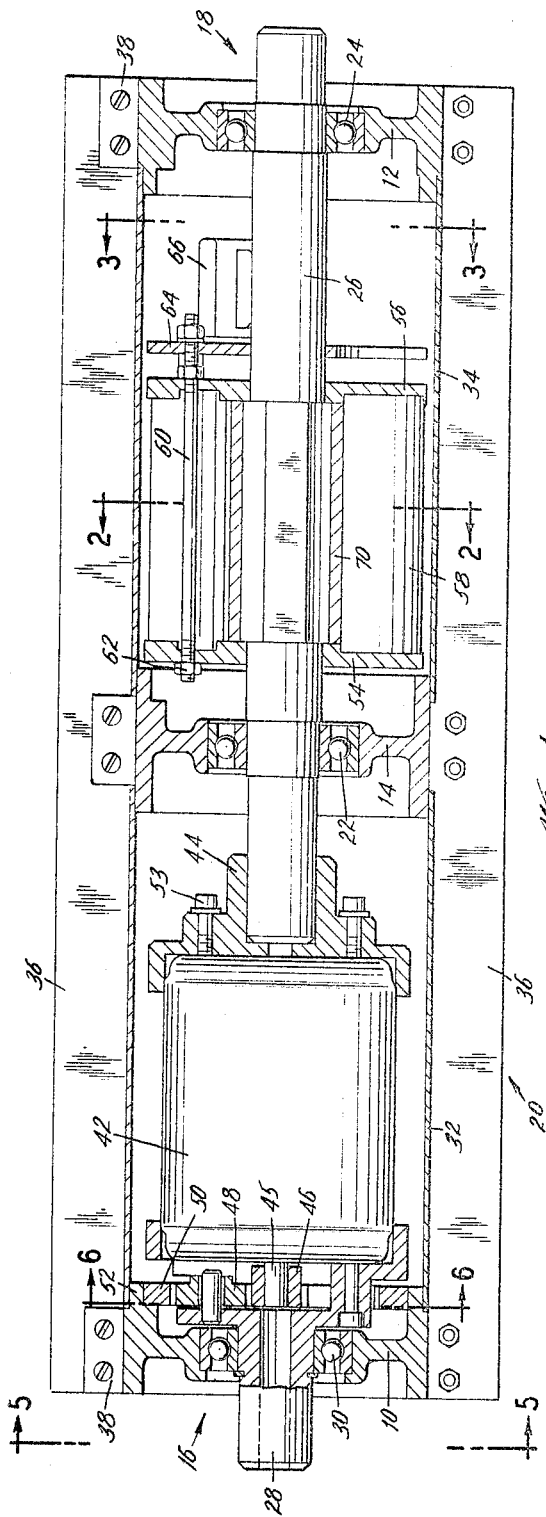
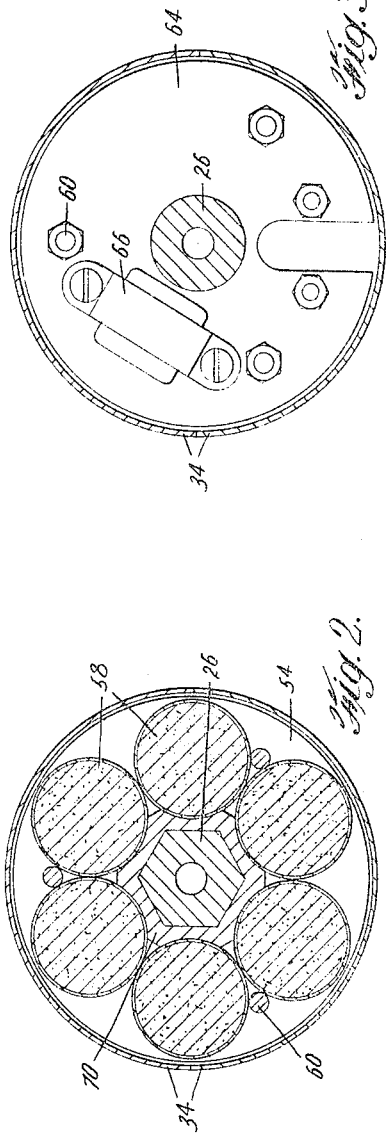
INVENTORS
FRED L. GRANGER, JR.
NORMAN M. POTTER
ALAN D. SMITH
BY
Henry A. Marzullo Jr.
ATTORNEY Sept. 13, 1966  F. L. GRANGER, JR., ET AL  3,271,939
POWERED UNIT FOR A LAWN MOWER OR SIMILAR DEVICE
Filed Dec. 19, 1963  3 Sheets-Sheet 2

INVENTORS
FRED L. GRANGER, JR.
NORMAN M. POTTER
ALAN D. SMITH
BY
Henry A. Marzullo Jr.
ATTORNEY Sept. 13, 1966   F. L. GRANGER, JR., ET AL   3,271,939
POWERED UNIT FOR A LAWN MOWER OR SIMILAR DEVICE
Filed Dec. 19, 1963   3 Sheets-Sheet 3
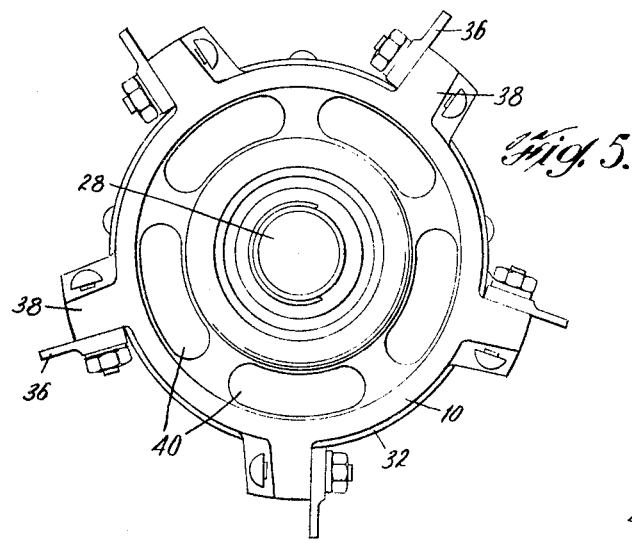
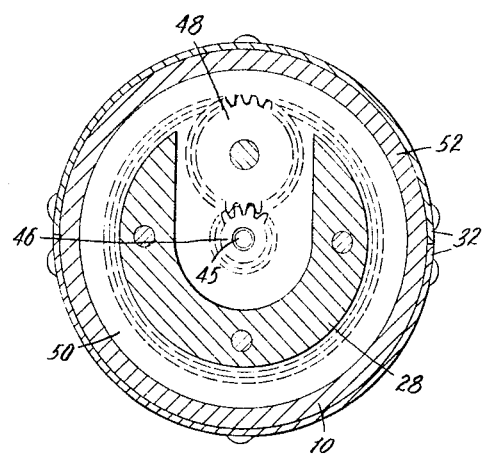
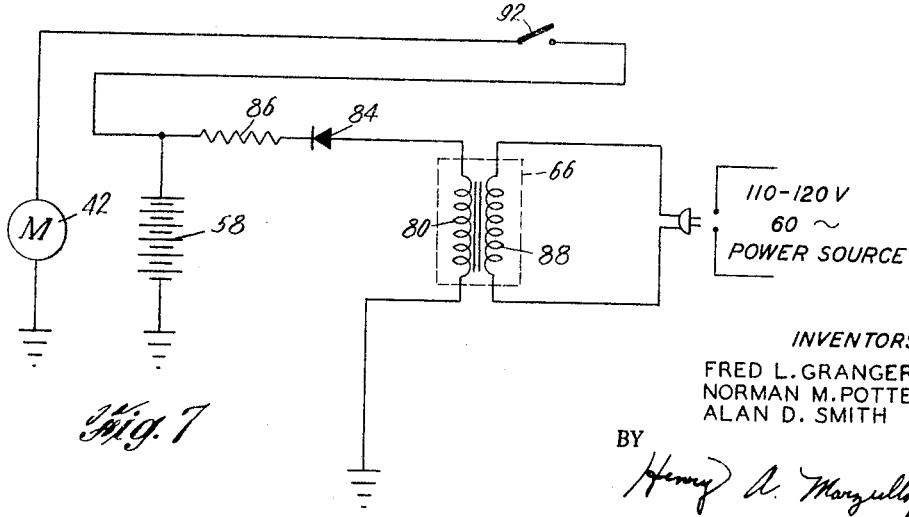
INVENTORS
FRED L. GRANGER, JR.
NORMAN M. POTTER
ALAN D. SMITH
BY
Henry A. Marzullo Jr.
ATTORNEY

United States Patent Office 3,271,939
Patented Sept. 13, 1966

3,271,939
POWERED UNIT FOR A LAWN MOWER
OR SIMILAR DEVICE
Fred L. Granger, Jr., Cleveland, Norman M. Potter, Rocky River, and Alan D. Smith, Fairview Park, Ohio, assignors to Union Carbide Corporation, a corporation of New York
Filed Dec. 19, 1963, Ser. No. 331,681
6 Claims. (Cl. 56—26)

This invention relates to a powered unit for a lawn mower or similar device such as a lawn sweeper. More particularly, the invention is specifically directed to a novel cordless electric lawn mower construction wherein all of the power elements thereof are disposed within a rotating reel assembly.

It is the primary object of the invention to provide a low cost, lightweight and improved cordless electric lawn mower.

Another object of the invention is to provide a compact and efficient lawn mower which is easy to handle and to operate and which is provided with a low silhouette and low center of gravity.

A further object of the invention is to provide an improved lawn mower which contains fewer parts and is relatively inexpensive to manufacture.

These and other objects and advantages will be more readily understood by reference to the accompanying detailed description and drawings in which:

FIGURE 1 is an elevational view partially in section of the powered unit as used for the cutter reel assembly of the lawn mower of the invention;

FIGURE 2 is a sectional view taken on line 2—2 of FIGURE 1;

FIGURE 3 is another sectional view taken on line 3—3 of FIGURE 1;

FIGURE 5 is an end elevational view illustrating the reel blades and associated support bracket arms;

FIGURE 6 is a sectional view taken on line 6—6 of FIGURE 1; and

FIGURE 7 is a schematic diagram illustrating a charger circuit for the lawn mower of the invention.

Figure 4:
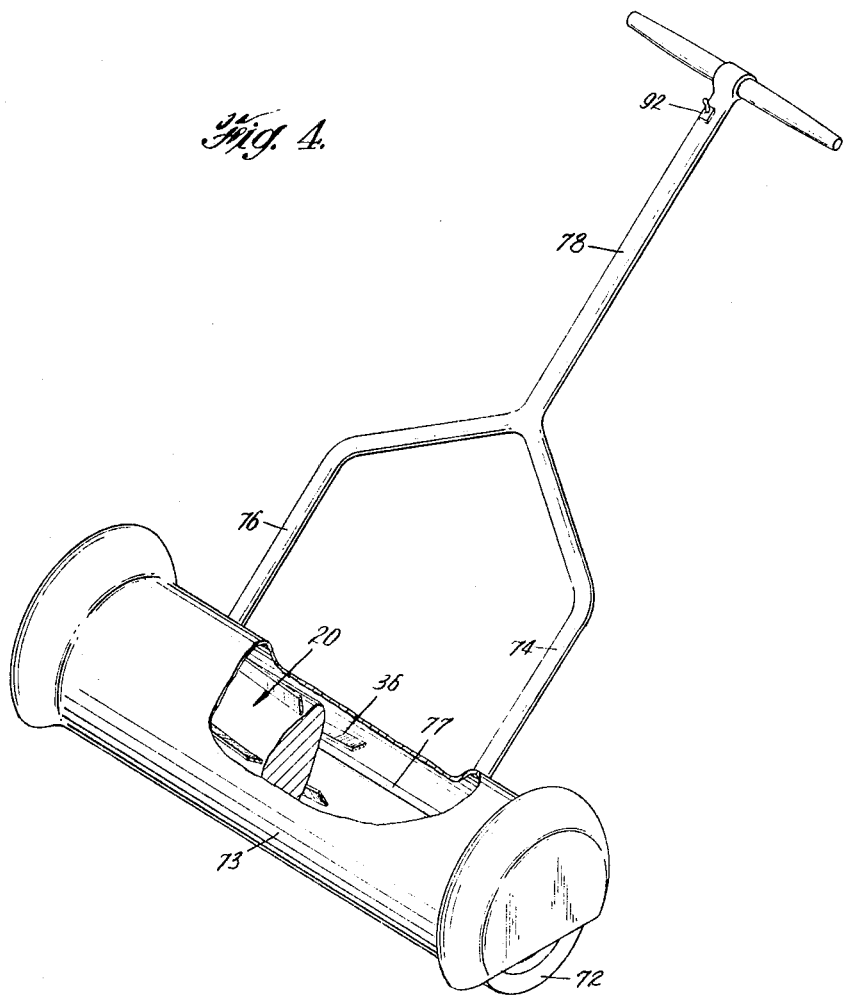
FIGURE 4 is a perspective view of the lawn mower construction illustrating the frame, handle bars, cutter bar and cutter reel assembly.

In a preferred embodiment of the invention, the major framework of the powered unit of the invention is composed of three bearing housings 10, 12 and 14 which are disposed respectively at opposite ends 16 and 18 and the central portion of the lawn mower reel assembly 20. As may be seen in FIGURE 1, two of these bearing housings 12 and 14 are respectively supported by suitable precision roller ball bearings 22 and 24 disposed about a stationary shaft 26. Bearing housing 10 is supported from an end shaft and motor support 28 and bearing 30. Suitable protective covers 32 and 34 are mounted between the end bearing housings 10 and 12 and the middle bearing housing 14. As is best shown in FIGURE 5, straight reel blades 36 are suitably secured to the boss like portions 38 of the bearing housings which are also provided with suitable lightening and/or access holes 40. Of course, it will be understood that the reel blades 36 are shown merely for the purpose of illustration and that they may be of the other shapes and arrangement.

A D.C. motor 42 is disposed between a motor supporting plate 44 and the end shaft and motor support 28. The plate 44 is suitably attached by conventional means to the stationary shaft 26. Low voltage, low speed and high efficiency are characteristic of such motor 42. As best shown in FIGURES 1 and 6, the motor shaft 45 is provided with a pinion gear 46, which engages an idler gear 48 suitably rotatively mounted to the end shaft and motor support 28, which in turn engages an internal gear 50. The internal gear 50 is mounted about the lip portion 52 of the end bearing housing 10 and the motor 42 is fixedly held to the motor supporting plate 44 by means of suitable fasteners 53. Of course, other means may also be used to connect the motor shaft 45 to the housing 10 and contiguous reel blades 36 such as by pulleys and a belt.

Power package end plates 54 and 56 containing a plurality of secondary batteries 58 therebetween are suitably held together by a plurality of tie rods 60 and associated nuts 62. These end plates 54 and 56 are fixedly attached to the stationary shaft 26. As best shown in FIGURE 3, another plate 64 for supporting a voltage stepdown transformer 66 and other associated charging elements (not shown) is also rigidly secured to the tie rods 60 and the stationary shaft 26. As clearly seen in FIGURE 2, a saddle 70 is used for maintaining and aiding to hold the batteries in equally spaced apart relation about the stationary shaft 26. It will be noticed that the stationary shaft 26 is hexagonally shaped in the portion thereof which lies between the power package end plates 54 and 56. Suitable shallow apertures (not shown) may be provided in both end plates 54 and 56 for positively locking the batteries 58 therebetween.

FIGURE 4 illustrates the lawn mower reel assembly 20 rotatively supported for movement over the ground by suitable wheels 72 suitably disposed about the stationary shaft 26 and the end shaft and motor support 28. A frame or rigid protective cover 73 having extending arms 74 and 76 for supporting handle bar means 78 is also suitably supported from the stationary shaft 26 and the end shaft and motor support 28. A cutter bar 77 suitably adjustably mounted to the cover 73 is also shown. Of course, it should be apparent that it is altogether possible and may be preferred to have the wheels 72 and the stationary shaft 26 independently secured to the frame and offset from each other so as to facilitate a greater control over the height adjustment of the reel blades 36 from ground level. In this regard, a third ground wheel pivotally secured to the frame of the lawn mower may be utilized if desired for providing an adjustment in the height of the reel blades. Furthermore, it will also be appreciated that although two shafts are shown in the preferred embodiment of the invention, one, three or more shafts may be utilized in other modifications of the invention.

The various components of the charging circuit diagram which are mounted on plate 64 is best shown schematically in FIGURE 7. This circuitry is typical for charging the batteries 58. As shown there, the secondary winding 80 of the stepdown transformer illustrated in block form as 66 is wired in series with the batteries 58, half-wave rectifier 84 and a series current-limiting resistor 86, the primary winding 88 being connected across a suitably A.C. supply source, such as the conventional 110–120 volt, 60 cycle household electric supply. A suitable switch 92 secured to the handle bar 78 and provided in the motor-battery ground loop remains open during the charging cycle and is closed when the lawn mower is in operation and discharging the batteries 58. No filtering is required for this charging circuit and electric shocks are minimized due to the low voltage transformer which isolates the battery from the A.C. power source. It should be apparent that it may be desirable in some cases to mount the batteries and charger on a suitable base outside of the reel assembly.

It is not believed necessary to describe the operation or further describe minor details of construction of the lawn mower of the invention, inasmuch as such type of equipment is well-known to those skilled in the art. It should be noted that although the preferred embodiment of the lawn mower of the invention is illustrated as being manually propelled it can be readily adapted to be self-propelled by suitably gearing the rotating reel assembly 20 to the ground engaging wheels 72. A suitable clutch may be also be interposed between the wheels 72 and the rotating drive means so that the power to the wheels 72 can be disengaged therefrom.

Dry and wet with dew lawns, of varying areas up to about 15,000 square feet and of varying density, body and of different types of grasses, were clipped from about ½ inch to about 1 inch to an even and smooth surface with the lawn mower of the invention. The conditions of the lawns clipped also varied from very clean and even to uneven and spotted with twigs, leaves, etc.

It should be apparent from the foregoing that many modifications and changes in the construction and arrangement of the parts may be made without departing from the spirit and scope of the invention. For example, other lawn conditioning devices may be suitably embodied within the basic form of the apparatus of the invention. One such variation may employ bristles in lieu of reel blades about the rotating assembly of the powered unit of the invention thus forming a lawn sweeper capable of sweeping debris from lawns.

What is claimed is:

1. A lawn mower comprising a frame having a cutter bar and extending handle bars and having ground engaging wheels for rotatably supporting said lawn mower for movement over the ground, a first and second stationary shaft having a D.C. motor interposed therebetween, one of said shafts having a plurality of secondary batteries disposed thereabout and between a pair of end plates attached thereto, said second shaft having means operatively connecting said motor and a reel blade assembly rotatively mounted about said first and second stationary shafts, said batteries being connected to said motor whereby said reel blade assembly is caused to rotate about said stationary shafts.

2. A cordless electric lawn mower comprising a frame having a cutter bar and extending handle bars, a cover for said lawn mower, a first and second stationary shaft having a D.C. motor interposed therebetween, ground engaging wheels for rotatably supporting said lawn mower for movement over the ground attached to said frame, said first stationary shaft being longer than said second stationary shaft and having a plurality of secondary batteries disposed thereabout and between a pair of end plates attached to said first shaft, said second shaft having gear means cooperating with said motor and a reel blade assembly rotatively mounted about said first and second stationary shafts, said batteries being connected to said motor whereby said reel blade assembly is caused to rotate about said stationary shafts and charging circuit means for recharging said battery.

3. A lawn mower provided with a reel blade assembly comprising a frame having a cutter bar and extending handle bars and having ground engaging wheels for rotatably supporting said lawn mower for movement over the ground, a first and second stationary shaft operatively cooperating in securing a D.C. motor in place therebetween, a plurality of secondary batteries fixedly disposed about one of said shafts and between a pair of end plates secured thereto, said reel blade assembly operatively connected to said motor by means disposed on said second shaft for rotating said assembly about said shafts, and electrical means connecting said batteries to said motor.

4. A cordless electric lawn mower comprising in combination, a frame rotatively supported by a pair of ground engaging wheels and having adjustably mounted on said frame a cutter bar and an upwardly extending handle bar, a powered reel having a fixed inner portion comprising a first and second supporting shaft, a direct current motor fixedly disposed therebetween and a rechargeable battery supported about one of said shafts and between a pair of end plates attached thereto, a surrounding outer shell portion rotatively mounted about said inner portion of said powered reel and comprising at least two end bearing housings having bearings fixedly mounted therein and a plurality of cutter blades circumferentially disposed about the outer periphery of said outer shell portion; means securing said supporting shafts to said frame and driving means for connecting the output shaft of said direct current motor to means for rotating said outer shell portion of said powered reel, and means for electrically connecting said battery to said direct current motor and means for electrically disconnecting and connecting same adjacent said handle bar.

5. The cordless electric lawn mower of claim 4 wherein charging circuit means for recharging said battery is disposed inside said outer shell portion of said powered reel and is fixedly secured to one of said supporting shafts.

6. A powered unit comprising a hollow member rotatably supported about a first and second stationary shaft having a D.C. motor interposed therebetween, one of said shafts having a plurality of secondary batteries disposed thereabout and between a pair of end plates attached thereto, said second shaft having means operatively connecting said motor and said hollow member, and said batteries being electrically connected to said motor whereby said hollow member is caused to rotate about said stationary shafts.

References Cited by the Examiner
UNITED STATES PATENTS

| | | | |
|---|---|---|---|
| 1,782,636 | 11/1930 | Stokes | 56—26 |
| 1,806,584 | 5/1931 | Borer | 56—26 |
| 2,597,735 | 5/1952 | Jepson | 56—26 |

FOREIGN PATENTS 23,944/03   1/1904   Great Britain.

ABRAHAM G. STONE, *Primary Examiner.*

J. O. BOLT, R. R. KINSEY, *Assistant Examiners.*